(12) United States Patent
Lambert et al.

(10) Patent No.: US 8,982,826 B1
(45) Date of Patent: *Mar. 17, 2015

(54) METHOD FOR TRANSMITTING INFORMATION IN A REGULATED SPECTRUM AND NETWORK CONFIGURED TO OPERATE IN THE REGULATED SPECTRUM

(71) Applicant: Marvell International Ltd., Hamilton (BM)

(72) Inventors: Paul A. Lambert, Fremont, CA (US); Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,232

(22) Filed: Sep. 4, 2013

Related U.S. Application Data

(63) Continuation of application No. 12/759,336, filed on Apr. 13, 2010, now Pat. No. 8,532,041.

(60) Provisional application No. 61/172,599, filed on Apr. 24, 2009.

(51) Int. Cl.
*H04W 4/00* (2009.01)
*H04J 3/17* (2006.01)
(Continued)

(52) U.S. Cl.
CPC ................................ *H04W 16/14* (2013.01)
USPC ........... 370/329; 370/338; 370/341; 370/437; 455/450

(58) Field of Classification Search
USPC ........ 370/310–350, 431–463; 455/422.1–466
See application file for complete search history.

(56) References Cited

U.S. PATENT DOCUMENTS 4,805,215 A  2/1989  Miller
5,708,656 A  1/1998  Noneman et al.
(Continued)

FOREIGN PATENT DOCUMENTS

CN  102067689  5/2011
JP  200728568  2/2007
(Continued)

OTHER PUBLICATIONS

Jung, et al.,"A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.

(Continued)

*Primary Examiner* — Tri H Phan

(57) ABSTRACT

Methods for transmitting information in a regulated spectrum and networks configured to operate within a regulated spectrum (and optionally, within a given geographic region) are disclosed. The methods generally include receiving or transmitting radio signals encoded with spectral allocation information, analyzing the spectral allocation information to determine available bands in the regulated spectrum for signal transmission, and transmitting signals on at least one of the available bands in the regulated spectrum. The spectral allocation information includes restriction(s) on a bandwidth or bandwidth range in the regulated spectrum; The network generally includes a central database storing the spectral allocation information, a transmitter configured to transmit radio signals encoded with the spectral allocation information, and a receiving device configured to receive the radio signals, analyze the available bands in the regulated spectrum from the spectral allocation information, and transmit signals on at least one of the available bands.

20 Claims, 11 Drawing Sheets

(51) Int. Cl.
*H04W 72/00* (2009.01)
*H04W 16/14* (2009.01)

(56) References Cited

U.S. PATENT DOCUMENTS

| | | |
|---|---|---|
| 6,347,091 B1 | 2/2002 | Wallentin et al. |
| 6,366,622 B1 | 4/2002 | Brown et al. |
| 6,374,117 B1 | 4/2002 | Denkert et al. |
| 6,519,461 B1 | 2/2003 | Andersson et al. |
| 6,553,229 B1 | 4/2003 | Dent |
| 6,640,308 B1 | 10/2003 | Keyghobad et al. |
| 6,675,328 B1 | 1/2004 | Krishnamachari et al. |
| 6,738,358 B2 | 5/2004 | Bist et al. |
| 6,741,862 B2 | 5/2004 | Chung et al. |
| 6,754,189 B1 | 6/2004 | Cloutier et al. |
| 6,934,566 B2 | 8/2005 | Kang et al. |
| 6,946,950 B1 | 9/2005 | Ueno et al. |
| 6,954,708 B2 | 10/2005 | Rakshani et al. |
| 7,079,811 B2 | 7/2006 | Lee et al. |
| 7,173,431 B1 | 2/2007 | Lo et al. |
| 7,206,840 B2 | 4/2007 | Choi et al. |
| 7,257,095 B2 | 8/2007 | Liu |
| 7,355,416 B1 | 4/2008 | Darshan |
| 7,377,441 B2 | 5/2008 | Wiklof et al. |
| 7,403,018 B1 | 7/2008 | Lo et al. |
| 7,529,548 B2 | 5/2009 | Sebastian |
| 7,627,025 B2 | 12/2009 | Wang et al. |
| 7,627,026 B2 | 12/2009 | Wang et al. |
| 7,636,388 B2 | 12/2009 | Wang et al. |
| 7,659,003 B2 | 2/2010 | Aoki et al. |
| 7,826,411 B2 | 11/2010 | Gonikberg et al. |
| 7,849,333 B2 | 12/2010 | Schindler |
| 7,876,786 B2 | 1/2011 | Bahl et al. |
| 7,881,746 B2 | 2/2011 | Desai |
| 7,898,948 B2 | 3/2011 | DiGirolamo et al. |
| 7,936,714 B1 | 5/2011 | Karr et al. |
| 7,995,544 B1 | 8/2011 | Benveniste |
| 8,000,715 B2 | 8/2011 | Melpignano et al. |
| 8,060,017 B2 | 11/2011 | Schlicht et al. |
| 8,107,391 B2 | 1/2012 | Wu et al. |
| 8,150,328 B2 | 4/2012 | Chaudhri et al. |
| 8,159,928 B2 | 4/2012 | Gorokhov et al. |
| 8,204,015 B2 * | 6/2012 | Chaudhri et al. ............. 370/329 |
| 8,233,928 B2 * | 7/2012 | Stanforth et al. ............. 455/509 |
| 8,274,885 B2 * | 9/2012 | Wu et al. ........................ 370/230 |
| 8,275,314 B1 | 9/2012 | Lin |
| 8,315,564 B2 | 11/2012 | Banerjea |
| 8,364,188 B2 | 1/2013 | Srinivasan et al. |
| 8,369,782 B1 | 2/2013 | Lin et al. |
| 8,472,968 B1 | 6/2013 | Kim |
| 8,532,041 B1 | 9/2013 | Lambert et al. |
| 8,571,479 B2 | 10/2013 | Banerjea |
| 8,588,705 B1 | 11/2013 | Tsui et al. |
| 8,649,734 B1 | 2/2014 | Lin et al. |
| 8,655,279 B2 | 2/2014 | Banerjea |
| 8,699,430 B2 * | 4/2014 | Chandramouli et al. ..... 370/329 |
| 8,811,318 B2 * | 8/2014 | Jo et al. ........................ 370/329 |
| 8,867,481 B2 * | 10/2014 | Banerjea et al. ............. 370/330 |
| 8,897,706 B1 | 11/2014 | Lin et al. |
| 2003/0198200 A1 | 10/2003 | Diener et al. |
| 2004/0044489 A1 | 3/2004 | Jones et al. |
| 2004/0063403 A1 | 4/2004 | Durrant |
| 2004/0110470 A1 | 6/2004 | Tsien et al. |
| 2004/0162106 A1 | 8/2004 | Monroe et al. |
| 2004/0214575 A1 | 10/2004 | Jovanovic |
| 2005/0058151 A1 | 3/2005 | Yeh |
| 2005/0120119 A1 | 6/2005 | Bhanu et al. |
| 2006/0063509 A1 | 3/2006 | Pincu et al. |
| 2006/0128308 A1 | 6/2006 | Michael et al. |
| 2006/0189359 A1 | 8/2006 | Kammer et al. |
| 2006/0239443 A1 | 10/2006 | Oxford et al. |
| 2006/0281404 A1 | 12/2006 | Lee et al. |
| 2007/0081553 A1 | 4/2007 | Cicchetti et al. |
| 2007/0103829 A1 | 5/2007 | Darshan et al. |
| 2007/0280471 A1 | 12/2007 | Fallahi et al. |
| 2008/0022162 A1 | 1/2008 | Qiu |
| 2008/0027033 A1 | 1/2008 | Gonda et al. |
| 2008/0076466 A1 | 3/2008 | Larsson |
| 2008/0129118 A1 | 6/2008 | Diab |
| 2008/0280638 A1 | 11/2008 | Malladi et al. |
| 2008/0310067 A1 | 12/2008 | Diab et al. |
| 2009/0005061 A1 | 1/2009 | Ward et al. |
| 2009/0168686 A1 | 7/2009 | Love et al. |
| 2009/0168725 A1 | 7/2009 | Mishra |
| 2009/0170497 A1 | 7/2009 | Miao et al. |
| 2009/0190541 A1 | 7/2009 | Abedi |
| 2009/0202013 A1 | 8/2009 | Sebastian |
| 2009/0209288 A1 | 8/2009 | Rofougaran |
| 2009/0235316 A1 * | 9/2009 | Wu et al. ........................ 725/81 |
| 2009/0275299 A1 | 11/2009 | Buch et al. |
| 2009/0291640 A1 | 11/2009 | Bhattad et al. |
| 2009/0291690 A1 | 11/2009 | Guvenc et al. |
| 2009/0311961 A1 | 12/2009 | Banerjea |
| 2009/0312027 A1 | 12/2009 | Foschini et al. |
| 2009/0325591 A1 | 12/2009 | Liu et al. |
| 2010/0009675 A1 | 1/2010 | Wijting et al. |
| 2010/0062799 A1 | 3/2010 | Ishii et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0189165 A1 | 7/2010 | Xu et al. |
| 2010/0216497 A1 | 8/2010 | Kawasaki |
| 2010/0248734 A1 | 9/2010 | Yamakazi et al. |
| 2010/0284355 A1 | 11/2010 | Jung et al. |
| 2010/0303026 A1 | 12/2010 | Chaudhri et al. |
| 2011/0021240 A1 | 1/2011 | Hiltunen et al. |
| 2011/0026488 A1 | 2/2011 | Patel et al. |
| 2011/0164538 A1 | 7/2011 | Karr et al. |
| 2012/0020319 A1 | 1/2012 | Song et al. |
| 2012/0195397 A1 | 8/2012 | Sayana et al. |
| 2012/0212628 A1 * | 8/2012 | Wu et al. ........................ 348/192 |
| 2013/0045687 A1 | 2/2013 | Banerjea |
| 2013/0045688 A1 | 2/2013 | Banerjea |
| 2013/0217401 A1 | 8/2013 | Edge et al. |
| 2014/0073251 A1 | 3/2014 | Banerjea |

FOREIGN PATENT DOCUMENTS

| | | |
|---|---|---|
| JP | 2007028568 | 2/2007 |
| WO | WO-0178252 | 10/2001 |
| WO | WO-02082751 | 10/2002 |
| WO | WO-02091623 | 11/2002 |

OTHER PUBLICATIONS

Jung, et al.,"A Power Control MAC Protocol for Ad Hoc Networks", In Proceedings of MOBICOM 2002, Sep. 23, 2002, pp. 36-47.

"Advisory Action", U.S. Appl. No. 12/190,251, Dec. 7, 2011, 3 pages.

"Final Office Action", U.S. Appl. No. 12/759,336, Feb. 25, 2013, 11 pages.

"Final Office Action", U.S. Appl. No. 12/534,361, Feb. 29, 2012, 13 pages.

"Final Office Action", U.S. Appl. No. 12/190,251, Sep. 13, 2011, 15 pages.

"Final Office Action", U.S. Appl. No. 12/323,292, Aug. 24, 2012, 26 pages.

"Foreign Office Action", Chinese Application No. 200980122587.0, Sep. 10, 2013, 11 Pages.

"Foreign Notice of Allowance", Japanese Application No. 2011-513586, Jul. 16, 2013, 2 pages.

"Foreign Office Action", Chinese Application No. 200980122587.0, Feb. 21, 2013, 17 pages.

"Foreign Office Action", European Patent Application No. 09789754.0, Mar. 11, 2013, 4 Pages.

"Foreign Office Action", Japanese Application No. 2011-513586, Apr. 9, 2013, 4 Pages.

"Foreign Office Action", European Patent Application No. 09789754.0, Jul. 12, 2012, 4 pages.

"Foreign Office Action", Japanese Application No. 2011-513586, Oct. 23, 2012, 7 pages.

(56) References Cited

OTHER PUBLICATIONS

"Foreign Office Action", EP Application No. 09789754.0, May 17, 2011, 8 pages.
"Information Technology—Telecommunications and Information Exchange Between systems—Local and Metropolitan Area Networks—Specific Requirements", IEEE Standard, Aug. 1, 2005, pp. 1-60.
"Information Technology—Telecommunications and Information Exchange between Systems—Local and Metropolitan Area Networks—Specific Requirements", Part 11: Wireless LAN Medium Access Control (MAC) and Physical Layer (PHY) Specifications, IEEE Standard 802.11h-2003 (Amendment to IEEE Std 802.11-1993), Oct. 14, 2003, 80 pages.
Qiao, et al.,"Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.
"Non-Final Office Action", U.S. Appl. No. 12/534,361, Oct. 12, 2011, 11 pages.
"Non-Final Office Action", U.S. Appl. No. 12/190,251, Mar. 29, 2012, 11 pages.
"Non-Final Office Action", U.S. Appl. No. 12/759,336, Oct. 4, 2012, 13 pages.
"Non-Final Office Action", U.S. Appl. No. 12/323,292, Dec. 21, 2011, 17 pages.
"Non-Final Office Action", U.S. Appl. No. 12/478,446, Dec. 28, 2011, 17 pages.
"Non-Final Office Action", U.S. Appl. No. 12/883,054, Nov. 22, 2013, 18 pages.
"Non-Final Office Action", U.S. Appl. No. 13/656,482, Mar. 19, 2013, 19 pages.
"Non-Final Office Action", U.S. Appl. No. 13/656,502, Feb. 21, 2013, 6 pages.
"Non-Final Office Action", U.S. Appl. No. 13/604,563, Apr. 5, 2013, 6 pages.
"Non-Final Office Action", U.S. Appl. No. 12/190,240, Jan. 6, 2012, 7 pages.
"Non-Final Office Action", U.S. Appl. No. 12/190,251, Mar. 29, 2011, 8 pages.
"Notice of Allowance", U.S. Appl. No. 13/656,502, Jun. 25, 2013, 11 pages.
"Notice of Allowance", U.S. Appl. No. 12/534,361, Feb. 14, 2013, 12 pages.
"Notice of Allowance", U.S. Appl. No. 12/190,240, May 16, 2012, 4 pages.
"Notice of Allowance", U.S. Appl. No. 13/604,563, Sep. 26, 2013, 5 pages.
"Notice of Allowance", U.S. Appl. No. 12/190,251, Oct. 4, 2012, 6 pages.
"Notice of Allowance", U.S. Appl. No. 12/478,446, Jun. 14, 2012, 6 pages.
"Notice of Allowance", U.S. Appl. No. 12/323,292, Jun. 28, 2013, 8 pages.
"Notice of Allowance", U.S. Appl. No. 13/656,482, Sep. 3, 2013, 8 pages.
"Notice of Allowance", U.S. Appl. No. 12/759,336, May 3, 2013, 9 pages.
"Part 11: Wireless LAN Medium Access Control (MAC) and Physical Layer (PHY) specifications", Information technology—Telecommunications and information exchange between systems—Local and metropolitan area networks—Specific requirements ,IEEE, Apr. 2003, pp. 1-69.
"PCT Search Report", Application No. PCT/US2009/046289, Oct. 29, 2009, 13 pages.
Tinnirello, et al.,"Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.
"Search Report", European Application No. 13169350.9, Aug. 13, 2013, 10 Pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Supplemental Notice of Allowance", U.S. Appl. No. 12/759,336, Aug. 14, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 13/656,482, Nov. 29, 2013, 2 pages.
"Final Office Action", U.S. Appl. No. 12/883,054, Jun. 9, 2014, 22 pages.
"Foreign Office Action", EP Application No. 13169350.9, May 9, 2014, 3 Pages.
"Non-Final Office Action", U.S. Appl. No. 13/911,979, Jun. 9, 2014, 11 pages.
"Foreign Office Action", Chinese Application No. 200980122587.0, Jan. 24, 2014, 10 pages.
"Non-Final Office Action", U.S. Appl. No. 13/757,276, Jan. 30, 2014, 9 pages.
"Non-Final Office Action", U.S. Appl. No. 13/911,979, Jan. 31, 2014, 19 pages.
"Supplemental Notice of Allowance", U.S. Appl. No. 13/656,482, Dec. 19, 2013, 2 pages.
"Foreign Office Action", CN Application No. 200980122587.0, Jul. 3, 2014, 12 Pages.
"Non-Final Office Action", U.S. Appl. No. 12/883,054, Sep. 11, 2014, 29 pages.
"Non-Final Office Action", U.S. Appl. No. 14/063,972, Sep. 24, 2014, 6 pages.
"Non-Final Office Action", U.S. Appl. No. 14/082,981, Aug. 4, 2014, 6 pages.
"Notice of Allowance", U.S. Appl. No. 13/757,276, Jul. 8, 2014, 6 pages.
"Corrected Notice of Allowance", U.S. Appl. No. 14/063,972, filed Jan. 26, 2015, 2 pages.
"Foreign Office Action", CN application No. 200980122587.0, Dec. 3, 2014, 10 pages.
"Notice of Allowance", U.S. Appl. No. 13/911,979, filed Nov. 20, 2014, 12 pages.
"Notice of Allowance", U.S. Appl. No. 14/063,972, filed Nov. 7, 2014, 8 pages.

* cited by examiner

US 8,982,826 B1

METHOD FOR TRANSMITTING INFORMATION IN A REGULATED SPECTRUM AND NETWORK CONFIGURED TO OPERATE IN THE REGULATED SPECTRUM

RELATED APPLICATIONS

This application is a continuation of U.S. Utility application Ser. No. 12/759,336, filed Apr. 13, 2010 which in turn claims the benefit of U.S. Provisional Application No. 61/172,599, filed Apr. 24, 2009, both incorporated herein by reference in their entirety.

FIELD OF THE INVENTION

The present disclosure generally relates to the field of spectral allocation and wireless signal transmissions within allowed bands in a regulated spectrum. More specifically, embodiments of the present disclosure pertain to methods for transmitting information in the white space(s) within a regulated spectrum, and networks configured to operate in the white space(s).

BACKGROUND

Traditionally, the bands between analog television broadcast signals were not used for transmissions due to possible destructive interference with the spectrally adjacent television broadcast signals. For example, FIG. 1A shows an analog television spectrum 100 having bands $TV_x$ and $TV_y$, each occupied by an analog signal, and spectral regions x1, x2, y1, and y2 which are unavailable for transmission due to possible interference with signals in bands $TV_x$ and $TV_y$. FIG. 1A further illustrates a minimum spacing "z" (on a band frequency scale) by which two analog transmissions must be distanced from each other to minimize interference.

However, digital signal transmission, such as digital television broadcasts, do not have the same risk of interference from signal transmissions on adjacent bands. Since television is now predominately broadcast in digital format, unused bands that were previously unavailable (colloquially known as "white spaces") can be used for signal transmission without interfering with adjacent bands. For example, FIG. 1B shows a digital television spectrum 100a comparable to that of FIG. 1A, having a white space "a" in place of spectral region x1, a white space "b" in place of spectral regions x2 and y2, and a white space c in place of spectral region y2. FIG. 1C shows an alternative digital radio spectrum 101 having bands 102a-102f occupied by a digital signal, and available white spaces 103a-103g. The Federal Communications Commission (FCC), which regulates such transmissions, has extensively discussed allowing unlicensed signal transmissions in the previously restricted white spaces. For example, the FCC has proposed new rules for use of unlicensed spectrum space that include requirements for querying a geolocation database.

The FCC has opened up new frequency bands for unlicensed use of the television and radio spectrum that will coexist with digital television (e.g., from 512 MHz to 698 MHz). These television white space bands will be regulated to ensure that equipment does not interfere with incumbent transmitters (like television broadcast channels). The FCC has defined the use of a geolocation database and spectral sensing as mechanisms to protect transmissions from the incumbent transmitters. Geolocation requires that a device intending to transmit in the television white space query a central database for available channels for the given location. The device cannot transmit until it has checked that there are no incumbent devices on the transmission channel.

To broadcast a wireless signal in a white space, a user having a wireless device capable of wireless (e.g. radio) transmission in the white space needs to know which bands in the spectrum are occupied by or reserved for broadcasts by other devices to determine whether transmitting on a given band is permitted in the user's particular geographic location. For example, FIG. 2 shows a wireless device 201 connected to a central database 203 containing spectral allocation information. The database 203 provides the available channels in the spectrum for a given physical or geographical location. In order to legally transmit signals in the regulated spectrum in the given physical or geographical location, the wireless device 201 must be able to access and obtain spectral allocation information stored in the centralized database 203. However, the wireless device 201 must access the database 203 other than by the use of the regulated spectrum. Such a connection to the centralized database is typically made by wired or wireless Internet connections 202 and 204 (e.g., cellular, WiFi, WAN, satellite) or a direct connection 206 to the centralized database.

The requirement of having an Internet connection (e.g., 202) to connect to the centralized database places a number of burdens on users, including: being in a location which offers Internet access; purchasing an Internet connection; accessing the Internet; having a device which supports a wired or wireless Internet connection; etc. For example, a user must be in the range of a WiFi access point (AP) to connect to the AP, have the ability to authenticate with the AP (which usually involves a cost of some kind), and have a device which supports WiFi connectivity. Further, a user having an Internet connection such as a cellular network data connection is burdened with the cost and range of the cellular network. A direct connection to the centralized database (without accessing the Internet) may be possible in some cases, but is generally unlikely since direct connections to centralized databases are typically reserved for Internet service providers, distributors, large companies, etc. The cost of such a connection, if possible, may not be feasible for typical users transmitting with wireless devices.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

This disclosure describes approaches for a device to obtain spectral allocation information without having to transmit in a regulated band and without need for an additional communication channel. Embodiments of the present disclosure relate to circuitry, architectures, networks, systems, methods, algorithms and software for transmitting on a white space band in a regulated spectrum.

In one aspect, the present disclosure relates to a network, including a central database storing spectral allocation information in a regulated spectrum; a first transmitter receiving the spectral allocation information from the central database, the first transmitter being configured to transmit a first radio signal encoded with the spectral allocation information; and a wireless device configured to receive the first radio signal, analyze the available bands in the regulated spectrum from the first radio signal, and transmit a second radio signal on at least one of the available bands. Additionally (or in place of the wireless device), the network further includes a second transmitter receiving further spectral allocation information from the central database, the second transmitter being configured to transmit a third radio signal encoded with the further spectral allocation information, the further spectral allocation information comprising a second geographic region different from the first geographic region, the second transmitter being located in the second geographic region.

These and other potential advantages of the present disclosure will become readily apparent from the detailed description of various embodiments below.

DETAILED DESCRIPTION

Figure 1A:
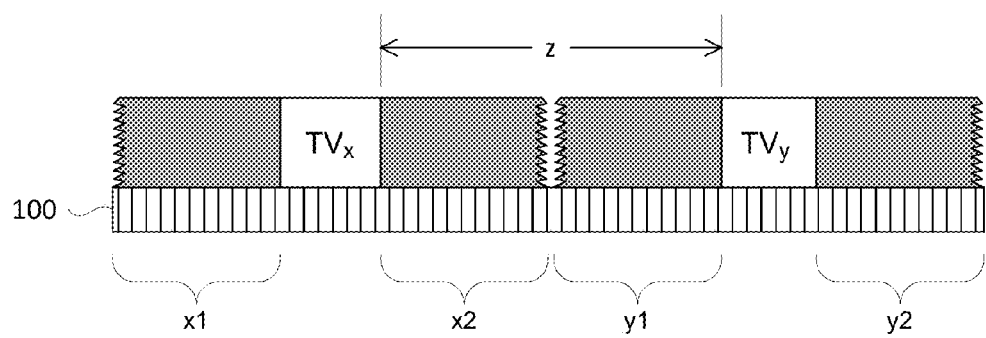
FIG. 1A is a diagram showing an analog television spectrum.
Figure 1B:
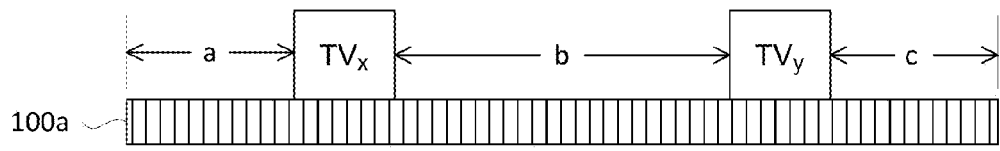
FIG. 1B is a diagram showing a digital television spectrum.
Figure 1C:
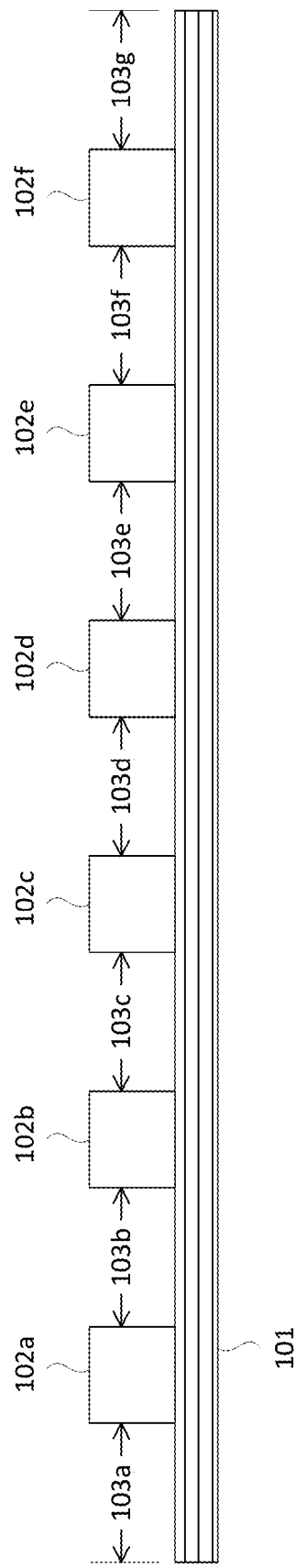
FIG. 1C is a diagram showing a digital radio transmission spectrum.
Figure 2:
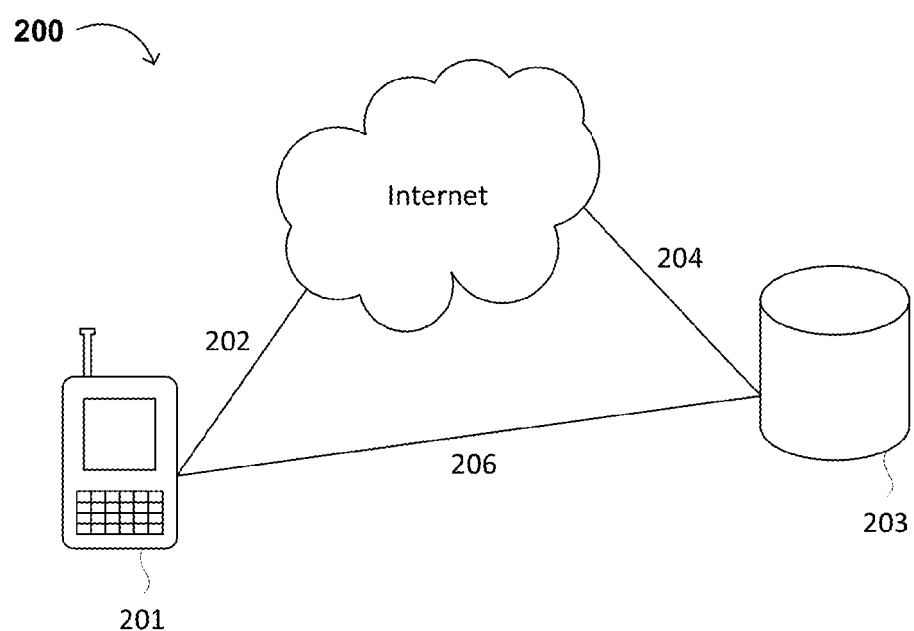
FIG. 2 is a diagram showing a conventional method of acquiring spectral allocation information.

Reference will now be made in detail to various embodiments of the invention, examples of which are illustrated in the accompanying drawings. While the invention will be described in conjunction with the embodiments provided below, the embodiments are not intended to limit the invention. On the contrary, the invention is intended to cover alternatives, modifications and equivalents that may be included within the scope of the invention as defined by the appended claims. Furthermore, in the following detailed description, numerous specific details are set forth in order to provide a thorough understanding of the present disclosure. However, the present invention may be practiced without these specific details. In other instances, well-known methods, procedures, components, and circuits have not been described in detail so as not to unnecessarily obscure aspects of the present disclosure.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, algorithm, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device) that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The present disclosure concerns a method for transmitting signals in a regulated spectrum and a network configured to perform the same. The method includes receiving radio signals encoded with spectral allocation information, then analyzing the spectral allocation information to determine available bands for signal transmission in the regulated spectrum, and transmitting the information on the available bands in the regulated spectrum.

Spectral availability for a given location can be provided by broadcasting (optionally repeatedly and/or periodically) spectral and location information from the database. A transmitter (e.g., a white space device) can be connected to the database (e.g., by the Internet), and following an optional authentication procedure for any wireless (client) devices that can receive the broadcasted information, the transmitter can then repeatedly and/or periodically transmit spectral information for one or more geographic regions within its broadcast range.

A wireless device using this geolocation mechanism does not need to transmit or have another mechanism to connect to the geolocation database. Such a device would first listen only and scan the possible bands for a transmission from a broadcast service carrying the spectral and location information from the database. Once found, the wireless device can receive packets from the service and receive spectral channel availability for all of the regions within the range of the broadcast service.

The wireless device can also use the knowledge of its own location (from GPS or other radio triangulation) and determine the region of the broadcast database that corresponds to its location. The specific location record sent for its determined region is used by the device to determine the available channels.

This has several advantages over existing techniques, including avoiding an internet connection for the device to obtain the geolocation information from the database; and enabling use of unlicensed bands subject to the prior geolocation restrictions (e.g., within white space) to obtain the location information (e.g., by listening to the broadcasts). Device location can be determined by an attached GPS device or service, or by radio triangulation (of TV white space transmission or other radios).

A broadcast transmission can cover a very large geographic area. However, the spectral allocation or availability information is ideally sent in smaller regions of geography (e.g., to provide granularity in geographic areas of broadcast transmission overlap on different channels). The region definitions can be sent as polygons (e.g., squares, hexagons, circles, etc.) associated with a particular spectral availability map. The list of polygon:spectral availability pairs can be sent as a sequence (e.g., data stream) in a single frame or over multiple frames. The transmission of this spectral information can be repeated on a regular basis to allow devices in the region to obtain the information in a timely manner. The broadcast transmitter (e.g., white space device) also contacts the primary database to update the definition of the regions in which it transmits.

An enhancement to this scheme provides only spectral information in the broadcast of selected channels that have broader geographic availability. Such channels can be described in larger regions and are more efficient to transmit. After a device finds a first available channel, it can use this channel to query a remote database for additional information relating to spectral availability. For this two-step spectral discovery, the region definition can be very efficient and may be sent in a single frame. In such cases, the first available channel can be sent in a beacon or equivalent mechanism. Once the receiving device has this channel information, it is able to use the identified available channel to retrieve subsequent channel availability data. When the range of the broadcast transmitter is fully enclosed in a single channel availability polygon (or region), the channel availability can be sent as a single bit designating that the channel can be used and is available to bootstrap knowledge of the remaining (and perhaps smaller) geolocation regions.

The disclosure, in its various aspects, will be explained in greater detail below with regard to various embodiments.

A First Network

Figure 3A:
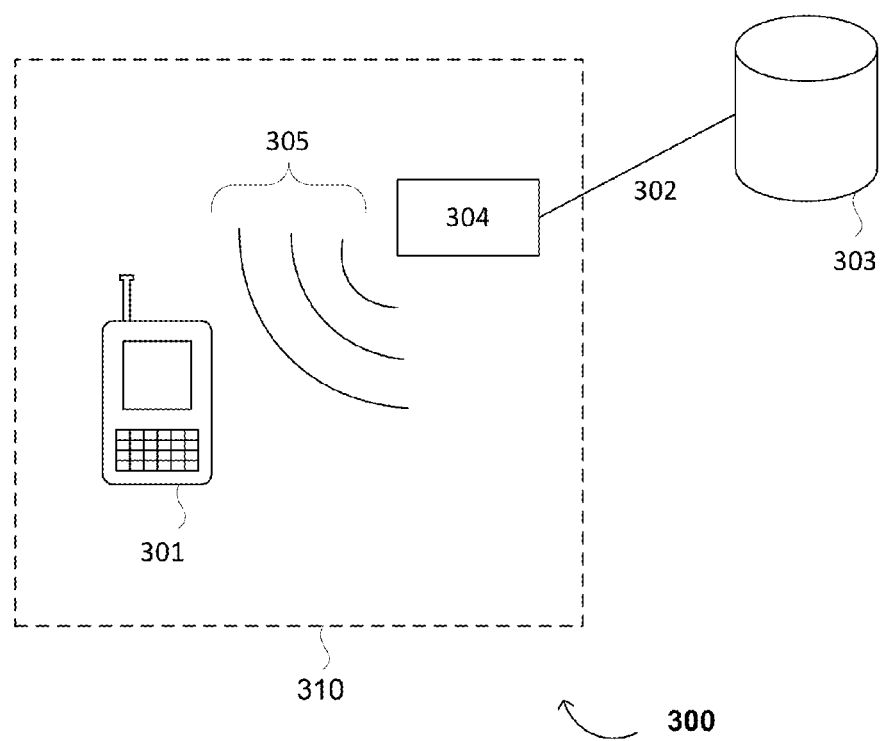
FIG. 3A is a diagram showing a first network operating in accordance with spectral allocation information transmitted in accordance with the present disclosure.

FIG. 3A shows a first embodiment of a network 300 and method for transmitting spectral allocation information according to the present disclosure. The network 300 comprises a central database 303, a transmitter 304, a connection 302 from the centralized database 303 to the transmitter 304, and a wireless device 301. The transmitter 304 and wireless device 301 are in a predetermined geographical region 310 (e.g., a "local region") to which the spectral allocation applies. The central database 303 provides the spectral allocation information to the transmitter 304 over the connection 302. The central database 303 may continuously or intermittently (e.g., periodically) send the spectral allocation information to the transmitter 304. Alternatively, the transmitter 304 can request the spectral allocation information from the central database 303. Transmitter 304 is configured to transmit or broadcast the spectral allocation information on a radio signal 305 continuously or intermittently (e.g., periodically, such as once per minute). The spectral allocation information generally includes information about the assigned or reserved bands in the spectrum (from which the transmitter 304 and/or wireless device 301 can determine the so-called "white spaces"). As a result, the transmitter 304 may be considered to be a "white space" device.

The central database 303 can include a single database, a plurality of databases, one or more networks connected to a database(s), and/or one or more database mirrors. For example, the central database 303 may reside on an FCC governed server, and the connections(s) 302 to the server can be regulated. The central database 303 may store data/information, including spectral allocation information, on a hard drive, an array of hard drives (e.g., a RAID array), one or more flash memory units, or any other computer or processor-readable medium.

In many metropolitan areas, the geographical region 310 may have many tens, and perhaps 100-200 or more, reserved bands for broadcasting digital television and radio signals, identification and/or security signals, shortwave transmissions, aviation and other transportation transmissions, cellular/wireless telephone transmissions, WLAN, Bluetooth and/or GPS signals, etc. In rural areas, such geographical regions 310 may have significantly fewer reserved bands (e.g., 5-50), and the size of the rural geographical region 310 may be significantly larger than a metropolitan geographical region 310.

In particular, digital television technology has enabled areas of the radio spectrum between about 50 MHz and 700 MHz for unlicensed use. In the United States, abandoned television frequencies can be found in the upper UHF band, covering from about 700 MHz to about 800 MHz. Television broadcasts and the associated white spaces will continue to exist in the United States in UHF and VHF frequencies. Outside the United States, the abandoned television channels are in the VHF range, but the resulting VHF white spaces may be reallocated for the digital radio standards DAB, DAB+, and DMB. However, the spectral allocation information can include, for example, information identifying reserved or assigned channels or bands (e.g., for digital television and/or or radio broadcasts), guard bands for such assigned channels or bands (e.g., the nominal value of the assigned band ±1-2%, or for digital television, ±3-6 MHz), and unreserved/unused (e.g., "white space") bands in very low frequency (VLF; 3-30 kHz), low frequency (LF; 30-300 kHz), medium frequency (MF; 300-3000 kHz), High frequency (HF; 3-30 MHz), Very high frequency (VHF; 30-300 MHz), ultra high frequency (UHF; 300-3000 MHz), and super high frequency (SHF; 3-30 GHz) ranges of the radio spectrum. The spectral allocation information can further include, for example, reserved or assigned channels or bands, guard bands, and unreserved bands of international equivalents to the above, including International Telecommunications Union (ITU) designated radio bands 2 (30-300 Hz), 3 (300 Hz-3000 Hz), 4 (3-30 kHz), 5 (30-300 kHz), 6 (300-3000 kHz), 7 (3-30 MHz), 8, (30-300 MHz), 9 (300-3000 MHz), and 10 (3-30 GHz); and European Union/North Atlantic Treaty Organization designated radio bands A (0-0.25 GHz), B (0.25-0.5 GHz), C (0.5-1 GHz), D (1-2 GHz), E (2-3 GHz), F (3-4 GHz), G (4-6 GHz), H (6-8 GHz), I (8-10 GHz), J (10-20 GHz), and K (20-40 GHz). Alternatively or additionally, the spectral allocation information can include restrictions on other wireless transmission characteristics, such as allowable transmission power limits or other wireless broadcast/transmission restrictions applied to one or more bands or bandwidths in one or more given geographic regions.

While many, if not all of these bands are regulated, a license may be required for certain bands or subbands in the regulated spectrum, whereas other bands or subbands do not require a license for broadcasting at that particular frequency or within the particular frequency range. For example, WiFi bands are regulated, but a license is not necessary to broadcast or transmit signals in the WiFi range of the spectrum. Similarly, a license is not necessary to broadcast or transmit signals in a television or AM/FM radio "white space" band, but the regulations regulating transmissions in such bands may be more stringent than in the WiFi range of the spectrum. In various embodiments, the reserved band(s) can be reserved within a predetermined geographic location (as described herein), and/or the reserved band(s) can be reserved within a predetermined time frame (e.g., from 6:00 AM to 12:00 midnight).

The connection 302 from the transmitter 304 to the central database 303 can include, for example, a wired or wireless internet connection, a local area network connection, a fiber optic connection, or any other type of electronic/computer connection capable of data communication. Radio signals 305 may include one or more wirelessly communicable transmissions. For example, the radio signals 305 can include cellular, WiFi, satellite, and/or WiMAX signals.

The transmitter 304 can be any device capable of wireless transmission of radio signals 305. The transmitter 304 may also have the ability to receive a wireless transmission. For example, the transmitter 304 may comprise a wireless access point, a cellular tower (including appropriate wireless components), a wireless router, any device which operates in accordance with an 802.11 wireless protocol, or a satellite, although other implementations are possible.

The transmitter 304 broadcasts spectral allocation information via the radio signal 305 throughout an area within the wireless transmission range of the transmitter 304 (e.g., part or all of the local geographic region 310). By definition, the radio signal 305 is carried on an unused band of the spectrum. In some embodiments, the broadcasts on the radio signal 305 are continuous, and in other embodiments, the broadcasts are repeated. In some cases, the repeated broadcasts are repeated periodically (e.g., once per minute, six-twelve times per minute, once per second, etc.). The spectral allocation information can be carried by any wireless electronic information signal and take any one of a variety of forms. For example, the spectral allocation information may be transmitted as segments, frames, packets, bytes, bits, and/or characters, although other implementations are possible.

After receiving the spectral allocation information, the transmitter 304 transmits a radio signal 305 encoded with the spectral allocation information over or in the geographic region 310. The radio signal 305 may be broadcast at (or at less than) the maximum power at which the transmitter 304 can effectively transmit radio signals. Wireless device 301 can then receive and analyze the spectral allocation information for information regarding unreserved or permissible bands (e.g., the white spaces). In addition, the transmitter 304 and/or wireless device 301 can scan part or all of the geographic region 310 for other devices or networks broadcasting or transmitting in one or more of the unreserved or permissible bands. Thereafter, the wireless device 301 can transmit in an unreserved or permissible band (optionally, unused by other devices and/or networks in the geographic region 310).

In a further embodiment, the transmitter 304 can transmit a type of "general notice" signal (e.g., a "beacon"), informing wireless devices in the geographic region 310 that additional bands may be available for wireless transmission. Accordingly, upon receiving such a notice signal from the transmitter 304, the wireless device 301 can transmit a wireless information request for detailed spectral allocation information. Generally, the wireless information request does not require authentication. In various implementations, the wireless information request comprises a public action frame or probe request, although other implementations are possible.

The wireless device 301 can then receive the radio signal 305 broadcast by the transmitter 304. The wireless device 301 can include any wireless device capable of receiving (and optionally, transmitting) a radio signal, preferably in a permissible (and optionally unused) band. For example, the wireless device 301 can include a cellular telephone, a personal digital assistant (PDA), an electronic book (e-book) reading device, a global positioning system (GPS) device, an electronic gaming device, a remote control device, a laptop or other portable computer, a rescue device, a display device, a television, a home theatre or other entertainment system, a home stereo system, or a wireless microphone system, among others.

A First Method

Figure 3B:
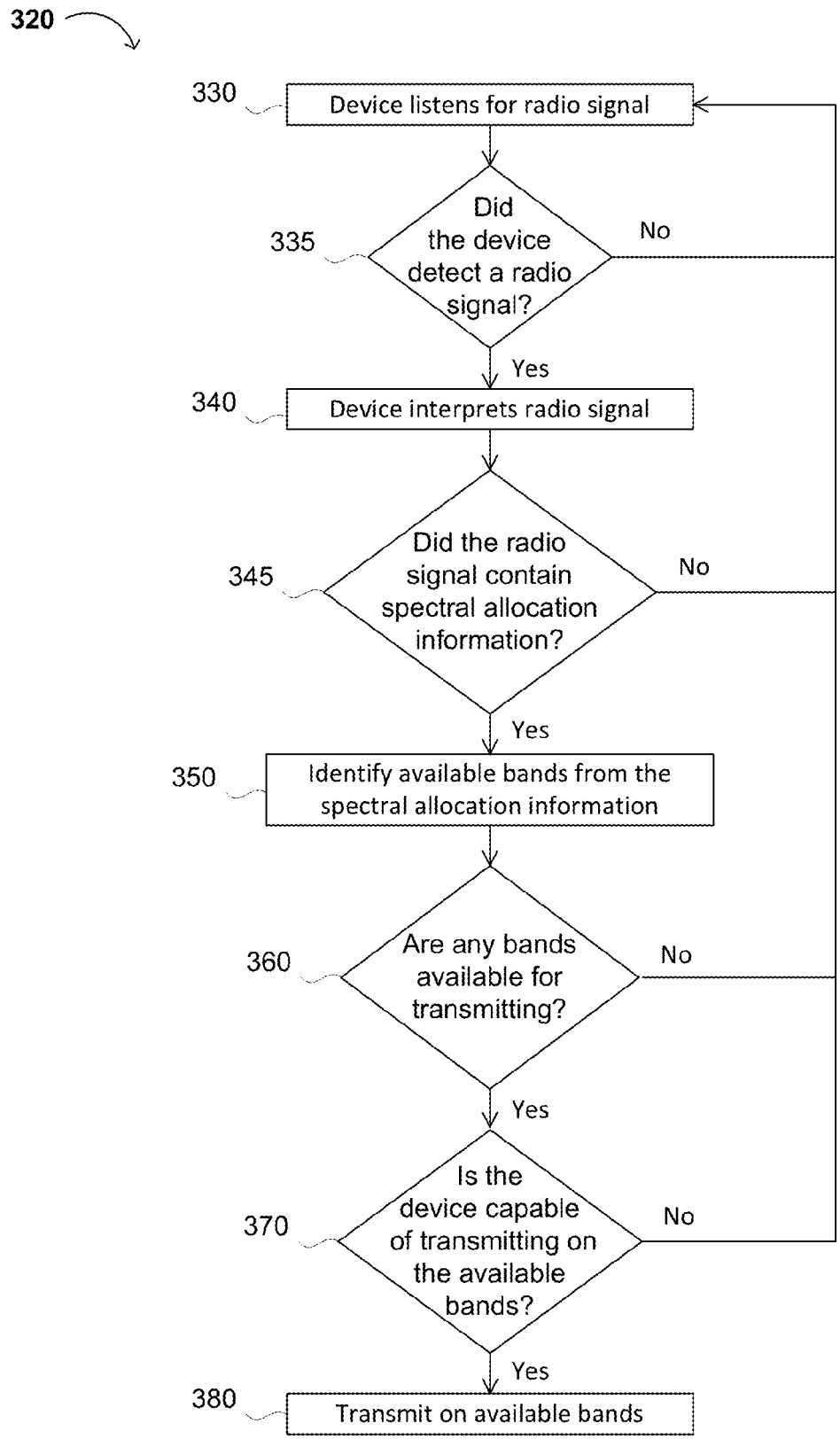
FIG. 3B is a flow chart showing a method for transmitting information in a regulated spectrum according to the present disclosure.

One method, according to flow diagram 320 in FIG. 3B, includes the wireless device (e.g., 301 in FIG. 3A) listening for a radio signal (e.g., 305 in FIG. 3A) at 330 (FIG. 3B). Then, at 335, if the wireless device detects a radio signal, the wireless device interprets the radio signal at 340. If the wireless device does not detect a radio signal, the device continues to listen for a radio signal at 330. In some embodiments, interpreting the radio signal comprises determining the reserved or assigned bands in the spectrum, including any guard band(s), and optionally, determining the allowable power of a signal transmitted on an allowable, unused band.

If, at 340, the wireless device interprets the radio signal and determines it to contain spectral allocation information, then the wireless device identifies one or more available bands from the spectral allocation information at 350. If the radio signal does not contain spectral allocation information, the device returns to listening for a radio signal at 330. If the wireless device identifies one or more bands available for transmitting at 360, then the wireless device determines if it is capable of transmitting on the available band(s) at 370. If so, then the wireless device transmits on one or more of the available bands at 380. If at either 360 or 370, the wireless device determines either that no bands are available for transmissions or that the wireless device is not capable of transmitting on the available bands, then the wireless device returns to listening for a radio signal at 330. The method 320 may be repeated as needed and/or desired to identify additional unused/available bands for additional transmissions to other devices and/or networks.

An Exemplary Transmitter

Figure 4:
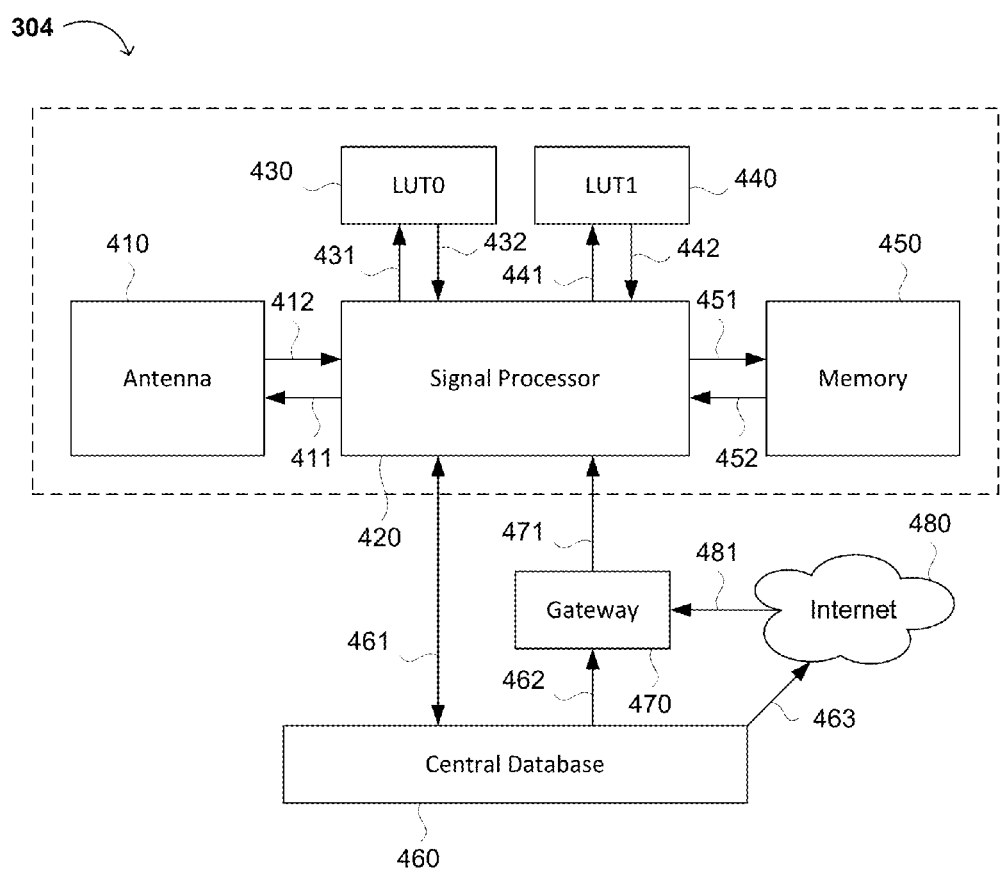
FIG. 4 is a diagram showing a block level diagram for an exemplary transmitter.

FIG. 4 shows a block-level logic diagram for an embodiment of the transmitter 304 in FIG. 3A. The transmitter 304 can include, for example, an antenna 410 operably coupled to a signal processor 420, a plurality of look up tables 430-440 (e.g., LUT0 and LUT1) operably coupled to the signal processor 420, a bulk memory unit 450 operably coupled to the signal processor 420, and an input 471 from the central database 460, routed through either a gateway 470 or the Internet 480, then through the gateway 470. Connections 411, 412, 431, 432, 441, 442, 451, and 452 can be any connection capable of data communication in an electronic device or between electronic devices (e.g., a bus, metal line, wires), and connections 461, 462, 463, 471, and 481 can be any connection capable of data communication between electronic devices (e.g., an Ethernet cable, wireless connections, fiber optic cable, etc.).

The look up tables 430 and 440 can each comprise a high speed (e.g., volatile) memory local to the signal processor 420, such as a random access memory (e.g., a register, a bank of registers, a block of RAM, cache memory, nonvolatile SRAM, etc.), configured to store various parameter values. For example, a first look up table (e.g., LUT0 430) can store the reserved or assigned transmission bands, and a second look up table (e.g., LUT1 440) can store the guard bands. Alternatively, the first look up table can store the reserved/assigned transmission bands and the guard bands, and the second look up table can store maximum power values for transmissions on unused bands. When the data to be stored in the look up tables 430 and 440 comprises a volatile memory, the data can be backed up by a non-volatile memory (e.g., a block of flash memory, a group of EPROM configuration bits, etc.). In alternative embodiments, the look up tables 430 and 440 can be replaced by a single LUT, three or more LUTs, or the look up tables 430 and 440 can be included within bulk memory unit 450. Bulk memory unit 450 can comprise a volatile memory, such as random access memory (RAM), or a non-volatile memory, such as a hard disk drive, a solid-state drive, or flash memory drive, as is known in the art.

The signal processor 420 generally coordinates all relevant activities on the transmitter 304. For example, the signal processor 420 can receive external inputs (e.g., from wireless devices in the same geographic region) over connection 412 from the antenna 410, and can transmit external signals (e.g., to wireless devices in the same geographic region) using the antenna 410 via connection 411. Generally, connections 411 and 412 comprise serial data paths. The antenna 410 can have any geometric configuration (e.g., coil, serpentine path, etc.) and comprise any material capable of transmitting and receiving wireless (e.g., radio) signals. The signal processor 420 communicates with LUT0 430, LUT1 440, and memory unit 450 over connections 431, 432, 441, 442, 451 and 452. Generally, connections 431, 432, 441, 442, 451 and 452 comprise parallel data paths, and optionally, connections 431, 441 and 451 have separate parallel control signal paths (e.g., for read enable and write enable signals). The signal processor 420 can comprise any digital data processor, for example, a microprocessor, microcontroller, or logic circuit such as a programmable gate array, programmable logic circuit/device, or application-specific integrated circuit. It is well within the abilities of one skilled in the art to design and use circuitry for the present transmitter 304.

An Exemplary Wireless Device

Figure 5:
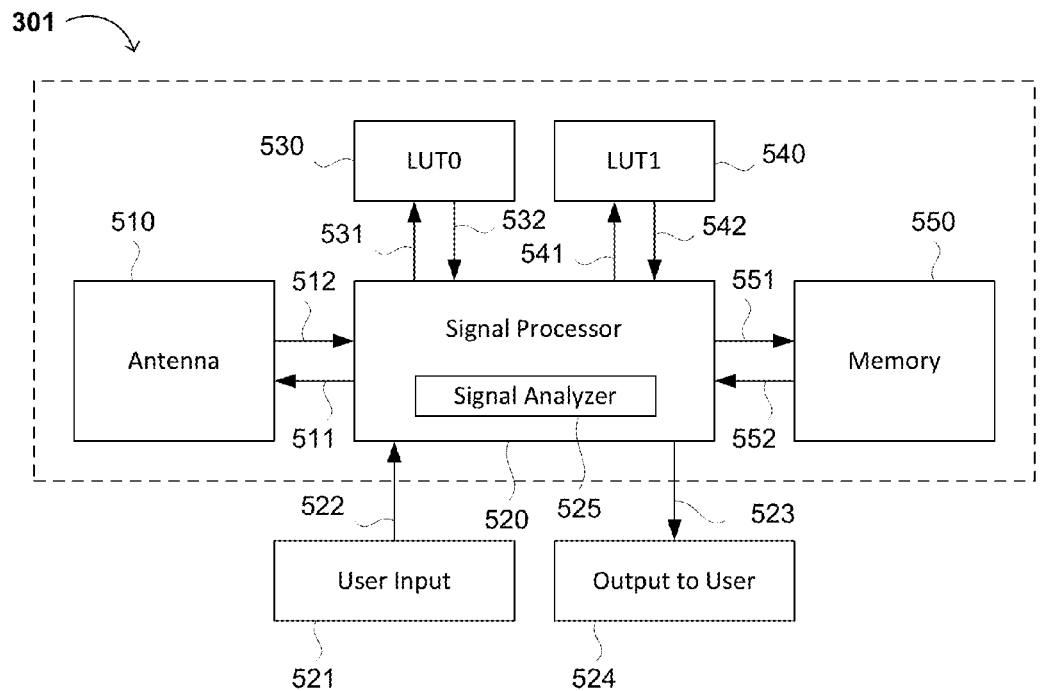
FIG. 5 is a diagram showing a block level diagram for an exemplary wireless device.

The wireless device 301 analyzes the spectral allocation information encoded in the radio signal to determine available or unused (e.g., "white space") radio bands in the local area. FIG. 5 shows a block-level logic diagram for an embodiment of the wireless device 301, which includes, for example, an antenna 510 operably coupled to a signal processor 520 which includes a signal analyzer 525, a plurality of look up tables 530-540 (e.g., LUT0 and LUT1) operably coupled to the signal processor 520, and a bulk memory unit 550 operably coupled to the signal processor 520. Structurally and/or functionally, the antenna 510 is at least similar to the antenna 410 in FIG. 4, and the look up tables 530-540 and bulk memory unit 550 in FIG. 5 are at least similar to the look up tables 430-440 and bulk memory unit 450 in FIG. 4, although the specific implementation(s) thereof may differ in certain details.

The signal processor 520 in FIG. 5 may be at least similar to the signal processor 420 in FIG. 4, but signal processor 520 (FIG. 5) may be further configured to execute some or all instructions of an operating system (e.g., WINDOWS [available from Microsoft Corp., Redmond, Wash.], LINUX, SOLARIS [available from Sun Microsystems, Inc.], MAC [available from Apple Computers, Cupertino, Calif.], etc.) and/or instruction set (e.g., x86). In addition, the signal analyzer 525 generally includes logic configured to process the spectral allocation information received from transmitter (e.g., 304 in FIGS. 3A and 4) via antenna 510 (e.g., identify reserved or assigned channels or bands [optionally including any guard bands], determine unreserved or unused bands, and optionally identify allowable power limits on transmissions to be sent on any such unreserved or unused bands).

The user input 521 and output 523 may comprise a graphical user interface and human input device (not shown). The graphical user interface can comprise a display apparatus capable of displaying alphanumeric, graphical, and/or iconic characters, and the human input device can comprise a keyboard, touchscreen, voice recognition device, or other apparatus or device capable of converting human inputs (e.g., keystrokes or selection of certain areas on a touchscreen corresponding to a desired input) to instructions to be executed by the signal processor 520, as is known in the art.

A Second Method

Figure 6:
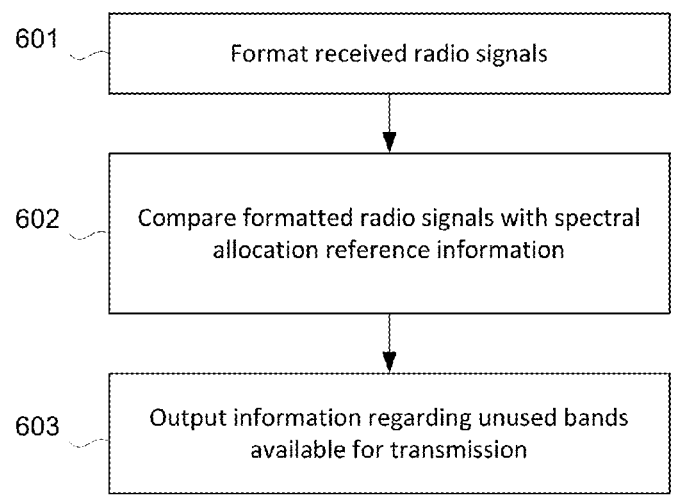
FIG. 6 is a flow chart showing a method of analyzing spectral allocation information.

FIG. 6 shows a flow diagram for an embodiment of a method of analyzing or processing spectral allocation information. For example, at 601, the analysis of the spectral allocation information (e.g., to be performed by the signal analyzer 525 of the wireless device 301 in FIG. 5) can include, for example, formatting received radio signals including the spectral allocation information encoded therein into data that can be processed by the wireless device. In one embodiment, the received radio signals comprise analog signals or amplitude-modulated signals, and formatting the received radio signals comprises demodulating the received radio signals and/or recovering the spectral allocation information from the received radio signals (e.g., using conventional wireless data recovery techniques).

At 602, the formatted data is compared with spectral allocation reference information. The spectral allocation reference information may be stored in bulk memory 550 (FIG. 5) or in a look up table (e.g., LUT1 540 in FIG. 5). For example, in a given portion of the regulated spectrum (e.g., the portion dedicated to digital television transmissions), one may know in advance which bands are reserved for such transmissions, what the guard band widths are, and what the acceptable power limits are for transmissions occurring in the "white space" near the reserved bands. Comparing the formatted received spectral allocation information with spectral allocation reference information enables the wireless device to confirm the reserved bands in a given geographic region, and thus, identify or determine with greater certainty the unused/available bands in that region.

At 603 (FIG. 6), information regarding unused (e.g., "white space") bands that are available for transmission is output by the signal processor (e.g., 520 in FIG. 5) to the user (e.g., on bus 523) or to other wireless devices in the geographic region, to enable selection of an unused band for wireless communication between devices in the geographic region. In an alternative embodiment, the signal processor automatically uses the information regarding unused bands that are available for transmission to initiate a wireless communication channel with one or more other wireless devices in the geographic region on/in one of the unused bands.

In a further embodiment, the wireless device may further attempt to detect one or more transmission band(s) used by other wireless devices in the same geographic region, then identify those used bands as being reserved or otherwise unavailable for use. Preferably, the wireless device scans the entire spectrum to determine whether other wireless devices in the same geographic region are using an unreserved band or channel for wireless transmissions. If any unreserved bands or channels in the spectrum are found to be used for such wireless transmissions, they can be designated as used or reserved, and an appropriate guard band and/or power limit for adjacent/nearby unused bands can be determined and/or set.

A Second Network

Figure 7:
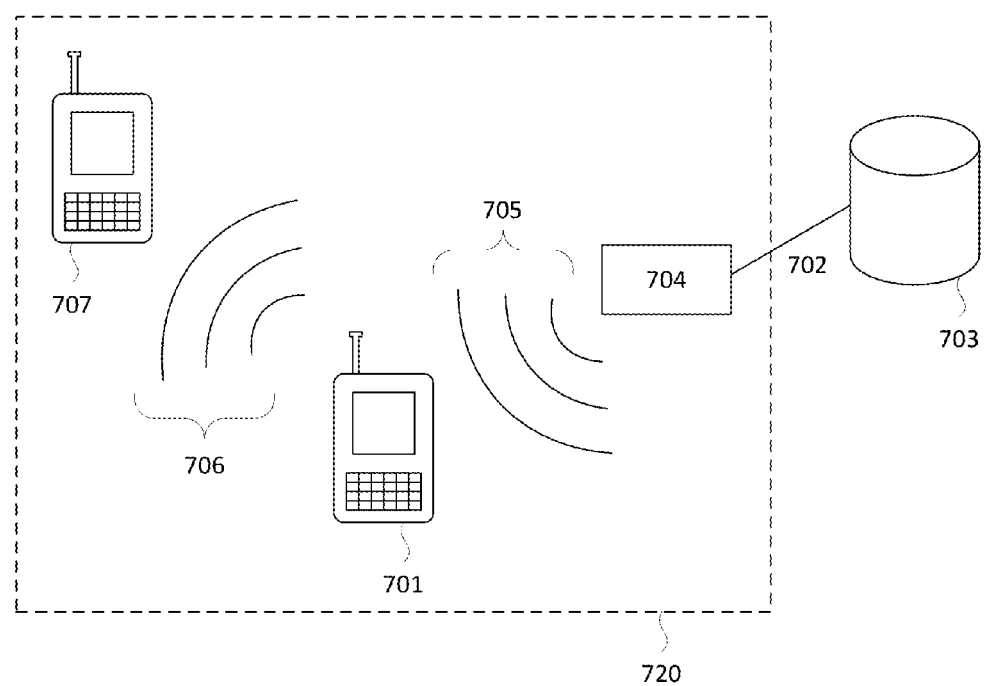
FIG. 7 is a diagram showing a second network operating in accordance with spectral allocation information transmitted and repeated in accordance with the present disclosure.

FIG. 7 shows a second embodiment of a network suitable for application of the present disclosure. The network includes a transmitter 704, connected to a central database 703 over connection 702, that broadcasts a radio signal 705 encoded with spectral allocation information over a local area 720. Wireless device 701 is in the local area 720. Components 701-705 of FIG. 7 are generally equivalent to components 301-305 of FIG. 3A, respectively, and thus the description of components 301-305 above and throughout the present application is incorporated herein with regard to components 701-705.

The wireless device 701 analyzes the spectral allocation information and transmits the spectral allocation information via radio signal 706 on the same band or a different band as that on which the spectral allocation information was received (e.g., signal 705). A second wireless device 707 (which may be the same type as or a different type from wireless device 701) can then receive the radio signal 706 transmitted by the first wireless device 701, and analyze the spectral allocation information for unused bands on which wireless device 707 may transmit information wirelessly. The wireless device 701 therefore can act as a repeater or extension for the transmitter 704 by re-broadcasting the spectral allocation information.

It is beneficial to know the location of the second wireless device 707 to determine when the spectral allocation information applies to that device. For example, if the radio signal 705 transmitted by the transmitter 704 is encoded in a manner that informs the wireless device 701 that mere reception of the radio signal 705 indicates that the wireless device 701 is within a predetermined area in which the spectral allocation information applies (e.g., within geographic region 720), then the second wireless device 707 can receive the re-broadcasted radio signal 706, but not be in a location where the spectral allocation information is applicable. Thus, in a further embodiment, regional, temporal or spatial information can be encoded in the radio signal 705, broadcast from the transmitter 704 to wireless device 701, then re-broadcast from wireless device 701 to the second wireless device 707 over radio signal 706. The regional or spatial information can include information relating to the location of the transmitter 704, the boundary of the geographic region 720 (and optionally the geographical area in which a given or predetermined band of the spectrum is reserved), and information by which the second device 707 can determine its location relative to the first device 701 and transmitter 704 by (radio) triangulation. Such triangulation can be conducted on the same band as or a different unused band from the band on which the regional, temporal or spatial information was sent by the transmitter 704 and/or the first wireless device 701.

By this method of determining the location of the second wireless device 707, a distance from the transmitter 704 to the first wireless device 701, and a distance from the first wireless device 701 to the second wireless device 707 can be ascertained. Therefore, the spectral allocation information is only applicable to second wireless device 707 if the distance from the second wireless device 707 to the transmitter 704 is within the region 720 (or if the distance from the second wireless device 707 to the first wireless device 701 is less than a distance from the first wireless device 701 to an edge of the radio signal transmission field surrounding the transmitter 704).

The transmitter 704 thus broadcasts both spectral allocation information and regional, temporal or spatial information. The regional or spatial information can include any location information which can be encoded in the radio signal 705 received by the wireless device 701. Such regional or spatial information can also be used by the wireless device 701 for determining its location (e.g., geographic, linear distance, etc.) with reference to the transmitter 704, and can include, for example, a time-based delay signal, a ping, and/or a beacon.

A Third Embodiment

Figure 8A:
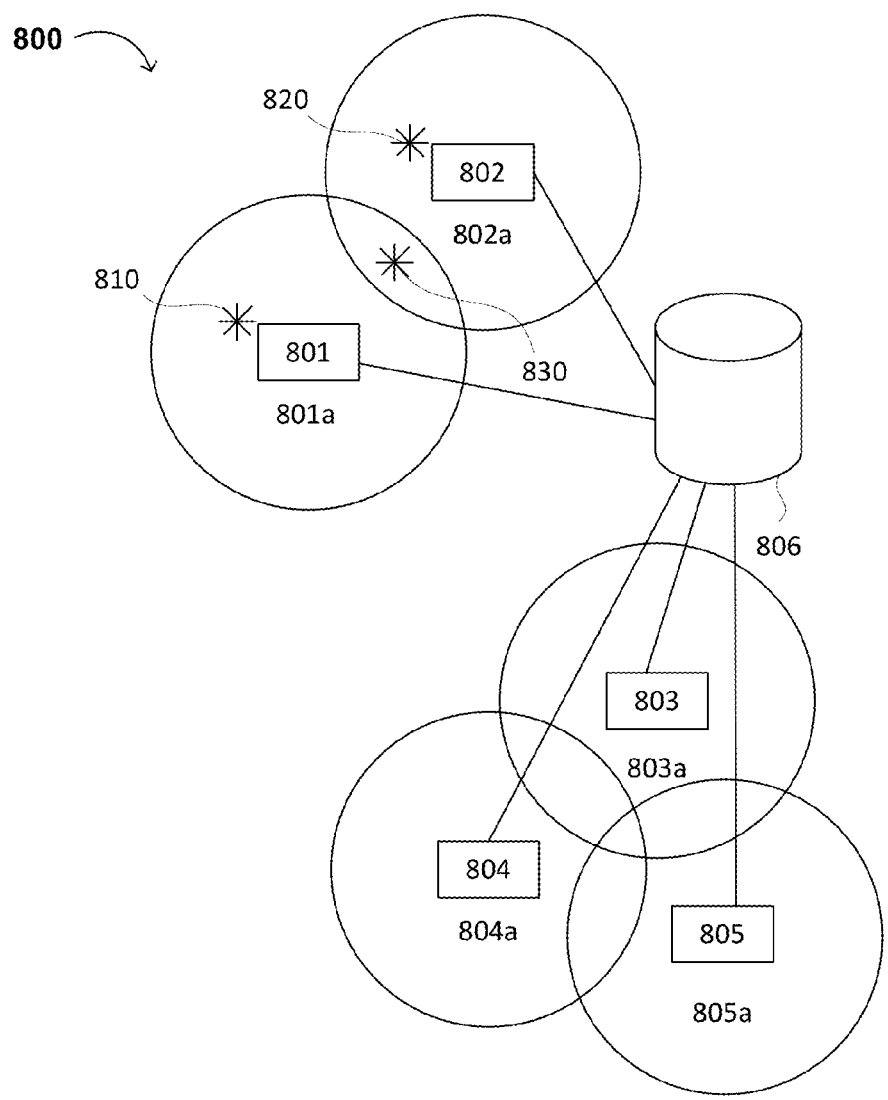
FIG. 8A is a diagram showing a third network operating in accordance with spectral allocation information and spatial/location information transmitted in accordance with the present disclosure.

FIG. 8A shows an embodiment of a network 800 in which the predetermined geographic regions overlap. For example, the network 800 comprises a central database 806 (at least similar to the central database 303 in FIG. 3A), and transmitters 801-805 in regions 801a-805a, respectively. The transmitters 801-805 can be at least similar to the transmitters (e.g., 304, 704) discussed in the present disclosure. Geographic regions 801a-805a can represent broadcast ranges for each transmitter 801-805, respectively, and thus may function as local areas to which the spectral allocation information broadcast by the transmitters 801-805 apply.

Wireless devices 810 and 820 (which can be any wireless device discussed in the present disclosure) are located in different regions 801a and 802a, respectively. Wireless device 830 (which can also be any wireless device discussed in the present disclosure) is located in both regions 801a and 802a. Wireless devices 810 and 820 analyze the spectral allocation information to identify reserved bands (e.g., bands reserved by the FCC, other regulatory agency, or standard setting organization) and determine which bands are unused and available for transmission in the respective regions 801a and 802a. Wireless devices 810 and 820 may also receive spatial information to enable other wireless devices (e.g., wireless device 830) to determine the geographic region in which such other wireless devices are located. Alternatively, wireless device 830 can receive spatial information from both transmitters 801 and 802 to determine the region in which it is located.

Wireless device 830 can thus determine that its location is within both regions 801a and 802a. In such a case, the reserved or assigned bands in both regions 801a and 802a apply to wireless device 830, and wireless device 830 cannot broadcast on a reserved or assigned band in either geographic region 801a or 802a. As a result, the number of unused bands available for transmissions by wireless device 830 may be more limited than those available to wireless devices (e.g., 810 or 820) located in a single region (e.g., 801 or 802). The situation could be more complicated when three or more regions have a common area of overlap (e.g., see regions 803a, 804a and 805a). On the other hand, wireless device 830 also enables devices 810 and 820 to communicate with each other, even though they might not otherwise be able to do so due to restrictions defined by the spectral allocation information in the respective geographic regions 801a and 802a.

A Fourth Embodiment

Figure 8B:
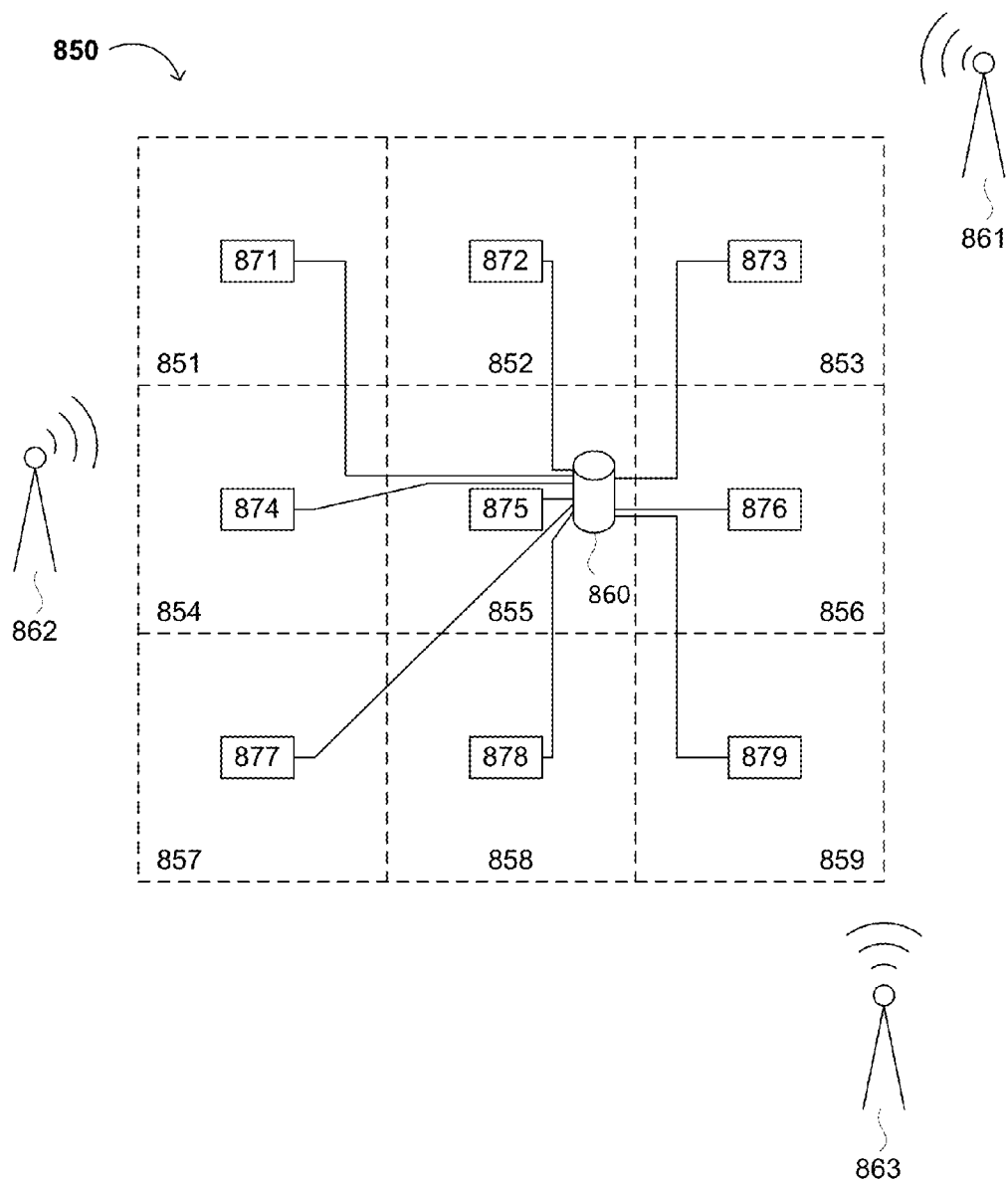
FIG. 8b is a diagram showing a fourth network operating in accordance with spectral allocation information and spatial/location information transmitted in accordance with the present disclosure, where the spatial/location information defines a grid.

FIG. 8B shows an embodiment of a network 850 in which the predetermined geographic regions are arranged in a grid. For example, the network 850 comprises a central database 860 (at least similar to the central database 303 in FIG. 3A) and transmitters 871-879 in predetermined geographic regions 851-859, respectively. Each of the transmitters 871-879 can be any transmitter discussed in the present application. Predetermined (local) geographic regions 851-859 correspond to the areas affected by the spectral allocation information broadcast by transmitters 871-879, respectively. The geometric shapes of geographic regions 851-859 are shown in FIG. 8B as squares, but they could also be rectangles, hexagons, octagons, triangles, irregular shapes, or combinations thereof, although other implementations are possible.

Broadcast antennas 861, 862 and 863 can represent digital television or radio signals on different channels in the spectrum, and the signals broadcast by antennas 861, 862 and 863 can reach different regions. For example, the signal broadcast by antenna 861 may reach geographic regions 871-873, 875-876, and 879; the signal broadcast by antenna 862 may reach geographic regions 871, 874, 875, and 877; and the signal broadcast by antenna 863 may reach geographic regions 875-876 and 878-879. Thus, wireless devices in geographic region 875 may have the fewest unused bands available, whereas wireless devices in geographic regions 872, 874, 877 and 878 may have the most unused bands available. The size of the geographic regions may vary as well, in accordance with design choices and/or optimization of available resources, etc. While the signal broadcast by antennas 861, 862 and 863 may not reach the entirety of each identified geographic region, for purposes of this embodiment and to avoid unnecessary complication, one may presume that the broadcast signal reaches the entire geographic region.

A Fifth Embodiment

Figure 9:
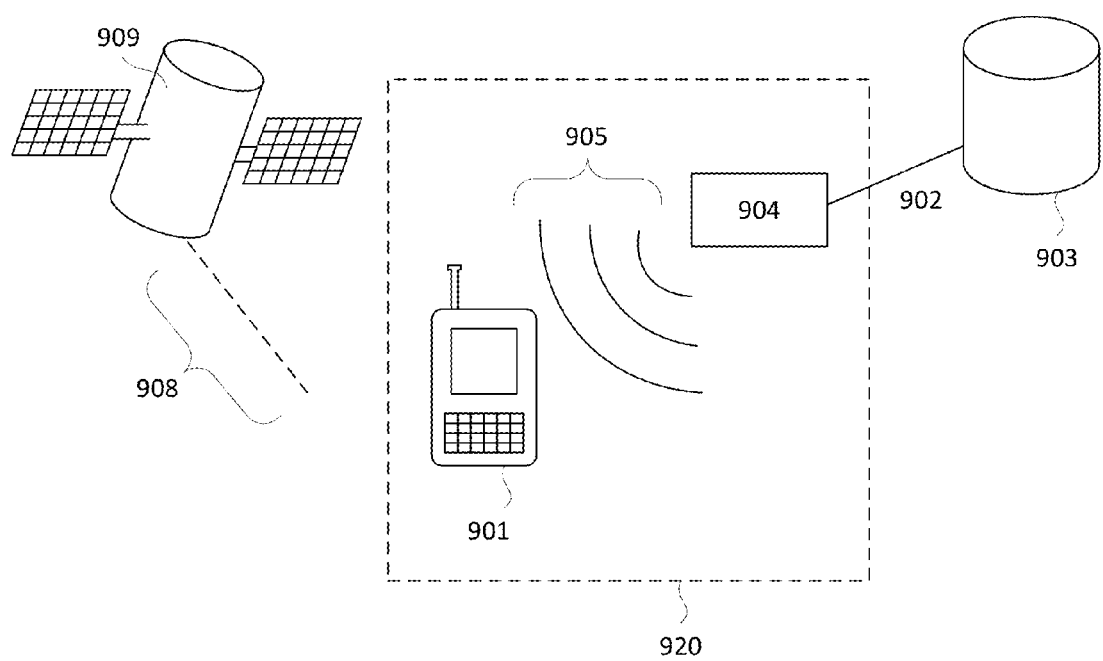
FIG. 9 is a diagram showing a fifth network operating in accordance with spectral allocation information and spatial/location information transmitted in accordance with the present disclosure.

FIG. 9 shows an embodiment of a network that comprises a central database 903 (at least similar to the central database 303 in FIG. 3A), a transmitter 904 connected to the central database 903 over connection 902, and a wireless device 901 in a local region 920. The transmitter 904 broadcasts a radio signal 905 encoded with spectral allocation information over the local region 920. Components 901-905 of FIG. 9 are at least similar to components 301-305 of FIG. 3A, and as a result, the description of components 301-305 above and throughout the present application is incorporated herein with regard to components 901-905 of FIG. 9.

In addition to receiving radio signal 905 from the transmitter 904, the wireless device 901 can also receive global positioning system (GPS) data 908 from a GPS satellite 909. The GPS data is used to determine the location of the wireless device 901, which the wireless device 901 can then use to reference its location with the spectral allocation information received over the radio signals 905. Receiving GPS data 908 alleviates the need to analyze the radio signal 905 for regional or spatial data to determine the geographic location of the wireless device 901.

Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the disclosure relates to algorithms and/or software that implement the above method(s). For example, the invention can further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program can be on any kind of readable medium, and the computer-readable medium can comprise any medium that can be read by a processing device configured to read the medium and execute code stored thereon or therein, such as a floppy disk, CD-ROM, magnetic tape or hard disk drive. Such code can comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

The devices of the present network, including the whitespace device, wireless device, and second wireless device can each include a computer readable set of instructions stored in a memory operably coupled to the each device, respectively. The computer readable set of instructions can be configured to, for example, perform logical processes, exert control over hardware components of each device, designate radio frequencies for receiving and transmitting, decode and encode signals, perform distance and location determining calculations, control a user interface, and perform analytical processes.

CONCLUSION/SUMMARY

Thus, embodiments of the present disclosure provide relate to circuitry, architectures, networks, systems, methods, algorithms and software for transmitting signals on unused (e.g., white space) bands in a regulated spectrum. The network generally includes a central database containing spectral allocation information, a transmitter in connection with the central database for transmitting the spectral allocation information, and a wireless device which receives the spectral allocation information transmitted by the transmitter. The network and components thereof include logic configured to perform functions such as receiving, transmitting, and analyzing. From the perspective of a wireless device, the method can include receiving a first radio signal encoded with spectral allocation information relating to the regulated spectrum, analyzing the spectral allocation information to determine available bands for signal transmission, and transmitting a second radio signal from the wireless device on at least one of the available bands indicated by the spectral allocation information. From the perspective of a transmitter, the method can include receiving the spectral allocation information from a central database, and transmitting the spectral allocation information from a transmitter via a radio signal on an available band in the regulated spectrum in accordance with the spectral allocation information.

The foregoing descriptions of embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A wireless device comprising:
at least a memory and a processor to implement operations comprising:
receiving, at the wireless device, a first radio signal encoded with spectral allocation information relating to a regulated spectrum;
analyzing the spectral allocation information to determine available white space bands for signal transmission in the regulated spectrum; and
transmitting a second radio signal from the wireless device on at least one of the available white space bands indicated by the spectral allocation information.

2. The wireless device of claim 1, wherein the first radio signal is received over a first unlicensed band in the regulated spectrum, and the second radio signal is transmitted over a second unlicensed band in the regulated spectrum different from the first unlicensed band.

3. The wireless device of claim 1, wherein the spectral allocation information comprises one or more restrictions on a bandwidth or bandwidth range in the regulated spectrum.

4. The wireless device of claim 3, wherein the one or more restrictions in the spectral allocation information comprise a prohibition on transmitting information on a licensed band in the regulated spectrum.

5. The wireless device of claim 3, wherein the restrictions in the spectral allocation information comprise regional, temporal, or spatial information.

6. The wireless device of claim 5, wherein the regional, temporal, or spatial information comprises location data and/or global positioning system (GPS) data.

7. The wireless device of claim 1, wherein the second radio signal is transmitted in a same geographical region as the first radio signal.

8. The wireless device of claim 7, further comprising receiving the second radio signal in the same geographical region as the first radio signal or in a different geographical region from the first radio signal.

9. The wireless device of claim 1, wherein the wirelessly communicable information request comprises a public action frame or a probe request.

10. A method comprising:
receiving, at a wireless device, a radio signal encoded with spectral allocation information corresponding to a regulated spectrum and encoded with regional, temporal, or spatial information corresponding to a geographic region;
formatting the received radio signal into data that can be processed by the wireless device;
comparing the formatted data with spectral allocation reference information to determine unused bands that are available for transmission on the regulated spectrum in the geographic region; and
outputting information regarding the unused bands.

11. The method of claim 10, wherein the outputting comprises outputting the information to an additional wireless device in the geographic region to enable selection of one of the unused bands for wireless communication between devices in the geographic region.

12. The method of claim 10, wherein the outputting comprises outputting the information to a user.

13. The method of claim 10, wherein the unused bands comprise unused white space bands.

14. The method of claim 10, wherein the radio signal comprises an analog signal or an amplitude-modulated signal, and wherein the formatting comprises demodulating the received radio signal.

15. The method of claim 10, wherein the spectral allocation reference information is stored in memory on the wireless device or in a look up table on the wireless device.

16. The method of claim 10, wherein the comparing enables the wireless device to identify reserved bands on the regulated spectrum, guard band widths on the regulated spectrum, or acceptable power limits for transmissions occurring in white space bands near the reserved bands on the regulated spectrum.

17. The method of claim 10, wherein the wireless device comprises a global positioning system (GPS) device.

18. A wireless transmitter configured to perform operations comprising:
receiving spectral allocation information from a central database, the spectral allocation information comprising one or more available white space bands for signal transmission in a regulated spectrum; and
transmitting the spectral allocation information via a radio signal on an available band in the regulated spectrum in accordance with the spectral allocation information.

19. The wireless transmitter of claim 18, wherein the spectral allocation information further comprises one or more prohibitions on transmitting information on a licensed band in the regulated spectrum.

20. The wireless transmitter of claim 18, wherein the spectral allocation information further comprises regional, temporal, or spatial information, and the one or more prohibitions on transmitting information on the licensed band are within a predetermined geographical region or time period defined by the spectral allocation information.

* * * * *